United States Patent
Bae et al.

(10) Patent No.: US 10,246,606 B2
(45) Date of Patent: Apr. 2, 2019

(54) TRANSPARENT FLEXIBLE HARD COATED FILM AND METHOD OF PRODUCING THE SAME

(71) Applicant: KOREA ADVANCED INSTITUTE OF SCIENCE AND TECHNOLOGY, Daejeon (KR)

(72) Inventors: Byeong-Soo Bae, Daejeon (KR); Gwang-Mun Choi, Daejeon (KR); Ji-Hoon Ko, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/456,891

(22) Filed: Mar. 13, 2017

(65) Prior Publication Data

US 2017/0183533 A1 Jun. 29, 2017

Related U.S. Application Data

(63) Continuation-in-part of application No. 14/830,875, filed on Aug. 20, 2015, now abandoned, which is a continuation of application No. PCT/KR2014/001146, filed on Feb. 12, 2014.

(30) Foreign Application Priority Data

Feb. 20, 2013 (KR) .......................... 10-2013-0018030

(51) Int. Cl.
| | | |
|---|---|---|
| *C09D 163/00* | (2006.01) | |
| *C09D 183/06* | (2006.01) | |
| *C08J 7/04* | (2006.01) | |
| *C08G 65/02* | (2006.01) | |
| *C08G 77/14* | (2006.01) | |

(52) U.S. Cl.
CPC ............ *C09D 163/00* (2013.01); *C08J 7/047* (2013.01); *C09D 183/06* (2013.01); *C08G 65/02* (2013.01); *C08G 77/14* (2013.01); *C08J 2483/04* (2013.01)

(58) Field of Classification Search
None
See application file for complete search history.

(56) References Cited

U.S. PATENT DOCUMENTS

| | | | |
|---|---|---|---|
| 5,750,587 A * | 5/1998 | Manzouji ............ | C08F 290/068 428/41.4 |
| 8,110,296 B2 | 2/2012 | Ulrich et al. | |
| 2009/0256287 A1 | 10/2009 | Fu | |
| 2009/0269504 A1 * | 10/2009 | Liao ......................... | C08J 7/047 427/515 |
| 2017/0267825 A1 * | 9/2017 | Kanaya .................... | B05D 7/02 |

FOREIGN PATENT DOCUMENTS

| | | |
|---|---|---|
| JP | 2003292891 A | 10/2003 |
| JP | 2005338790 A | 12/2005 |
| JP | 2006124441 A | 5/2006 |
| JP | 2009517522 A | 4/2009 |
| JP | 2009-280767 A | 12/2009 |
| JP | 2010-106199 A | 5/2010 |
| JP | 2012-092257 A | 5/2012 |
| JP | 2012241118 A | 12/2012 |
| KR | 10-2003-0063165 A | 7/2003 |
| KR | 10-2009-0031349 A | 3/2009 |
| KR | 10-2010-0111671 A | 10/2010 |
| KR | 10-2012-0101245 A | 9/2012 |
| WO | 2009/087752 A1 | 7/2009 |

OTHER PUBLICATIONS

International Search Report for App. No. PCT/KR2014/001146 dated May 20, 2014, 2 pages.
Non-final Office Action for U.S. App. No. 14/830,875, dated May 31, 2016, 7 pages.
Final Office Action for U.S. App. No. 14/830,875, dated Sep. 13, 2016, 6 pages.

* cited by examiner

*Primary Examiner* — Marc S Zimmer
(74) *Attorney, Agent, or Firm* — Brundidge & Stanger, P.C.

(57) ABSTRACT

The invention relates to a transparent flexible hard coated film and a method of producing the same, and more particularly, to a transparent flexible hard coated film including a scratch-resistant surface and a method of producing the same.

9 Claims, No Drawings

TRANSPARENT FLEXIBLE HARD COATED FILM AND METHOD OF PRODUCING THE SAME

CROSS-REFERENCE TO RELATED APPLICATION

This application is a Continuation-In-Part Application of U.S. application Ser. No. 14/830,875 filed on Aug. 20, 2015 that claims the benefit under 35 USC 119(a) of Korean Patent Application No. 10-2013-0018030 filed on Feb. 20, 2013, in the Korean Intellectual Property Office, the entire disclosure of which is incorporated herein by reference for all purposes.

TECHNICAL FIELD

The invention relates to a transparent flexible hard coated film and a method of producing the same, and more particularly, to a transparent flexible hard coated film including a scratch-resistant surface and a method of producing the same.

BACKGROUND

As industry develops, glass or metal conventionally used in various industry fields has been limited in extensive application due to its intrinsic properties. By way of example, ceramic materials such as glass have the problem of being easily broken with external shock or bending, and metals also have the disadvantages of low transparency and high specific gravity. In recent years, the conventionally used glasses or metals have been gradually substituted by polymer materials due to the above-described problems. However, these polymer materials have a lower surface hardness (i.e., pencil hardness) than glass and thus have the disadvantage of being easily scratched by friction. Therefore, with an increase in demand for the polymer materials, a hard-coating technique for improving the polymer materials has attracted a lot of attention.

Korean Patent Laid-open Publication No. 10-2010-0111671 suggests a resin composition for forming a hard coated layer, formed of a (meth)acrylic copolymer obtained by copolymerizing a vinyl group-containing monomer including a quaternary ammonium group and a (meth)acrylic monomer copolymerizable with the vinyl group-containing monomer, a polyurethane oligomer including three or more functional vinyl groups, and/or an acrylic monomer including two to six functional vinyl groups, and a film obtained by coating and curing the resin composition on a substrate. However, such a film has a pencil hardness of from about 4 H to about 6 H (JIS K 5600-5-4), and, thus, it is not suitable for application to the fields requiring a high hardness. Further, the cured product based on the acrylate has the disadvantage of a high contraction ratio than a cured product of an alicyclic epoxy group.

Further, U.S. Pat. No. 8,110,296B2 suggests a crystalline hard coating including a metastable mixed crystal formed of a carbide or nitride of a transition metal such as titanium with a siloxane oxide- or zirconium oxide-based ceramic. However, such a hard coating requires a vacuum deposition-based process such as PVD (Physical Vapor Deposition) or PECVD (Plasma Enhanced Chemical Vapor Deposition) instead of a resin-based process, and, thus, it is very inefficient in terms of cost and time. Further, most of the prior art techniques relating to hard coating focus on providing a high hardness and a high scratch resistance, but when such properties are applied to a film, its flexibility decreases. Thus, when a film is formed or bent, a hard coated layer is broken, which makes it difficult to achieve commercialization. Actually, it is difficult to produce a transparent hard coated film which includes a scratch-resistant surface having a pencil hardness of from 3 H to 9 H and is flexibly bent. Therefore, in order to expand the application of the film, it is necessary to develop a hard coating technique capable of maintaining a flexibility of a substrate film and also achieving a high surface hardness.

DETAILED DESCRIPTION OF THE INVENTION

Problems to be Solved by the Invention

The present disclosure can provide a transparent flexible hard coated film and a method of producing the transparent flexible hard coated film formed by using an ionic polymerizable siloxane hard coating composition including: oligosiloxane [component (A)] having on average at least one alicyclic epoxy group per molecule; and an ionic polymerization initiator [component (C)].

However, problems to be solved by the present disclosure are not limited to the above-described problems. Although not described herein, other problems to be solved by the present disclosure can be clearly understood by those skilled in the art from the following descriptions.

Means for Solving the Problems

In a first aspect of the present disclosure, there is provided a transparent flexible hard coated film formed by using an ionic polymerizable siloxane hard coating composition including: oligosiloxane [component (A)] having on average at least one alicyclic epoxy group per molecule; and an ionic polymerization initiator [component (C)].

In a second aspect of the present disclosure, there is provided a method of producing a transparent flexible hard coated film according to the first aspect of the present disclosure, including: coating an ionic polymerizable siloxane hard coating composition on a substrate film; and polymerizing the coated layer of the ionic polymerizable siloxane hard coating composition.

Effect of the Invention

According to the above-described means for solving the problems of the present disclosure, it is possible to produce a transparent flexible hard coated film by coating and polymerizing a siloxane hard coating composition on a substrate film. The present disclosure has advantages that a process is simple since the whole process for producing the transparent flexible hard coated film is stable in the atmosphere. Further, unlike the conventional hard coating technique which provides a high surface hardness but has the problem that a coated film is easily broken when being bent, the present disclosure provides a high scratch-resistant surface hardness and also provides flexibility that enables a coated film to be unbroken when being bent. Therefore, the producing method of the present disclosure is expected to contribute to the expansion of hard coated film application fields.

BEST MODE FOR CARRYING OUT THE INVENTION

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, the term "comprises or includes" and/or "comprising or including" used in the document means that one or more other components, steps, operation and/or existence or addition of elements are not excluded in addition to the described components, steps, operation and/or elements unless context dictates otherwise. The term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Through the whole document, the term "alkyl group" may include a straight or branched $C_{1-20}$ alkyl group, $C_{1-15}$ alkyl group, $C_{1-10}$ alkyl group, $C_{1-8}$ alkyl group or $C_{1-5}$ alkyl group, and may include, for example, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, or all available isomers thereof, but may not be limited thereto.

Through the whole document, the term "alkenyl group" refers to a monovalent hydrocarbon group including at least one carbon-carbon double bond in addition to the alkyl group having two or more carbon atoms among the above-defined alkyl groups, and may include a straight or branched $C_{2-20}$ alkenyl group, $C_{2-15}$ alkenyl group, $C_{2-10}$ alkenyl group, $C_{2-8}$ alkenyl group or $C_{2-5}$ alkenyl group, but may not be limited thereto.

Through the whole document, the term "alkynyl group" refers to a monovalent hydrocarbon group including at least one carbon-carbon triple bond in addition to the alkyl group having two or more carbon atoms among the above-defined alkyl groups, and may include a straight or branched $C_{2-20}$ alkynyl group, $C_{2-15}$ alkynyl group, $C_{2-10}$ alkynyl group, $C_{2-8}$ alkynyl group or $C_{2-5}$ alkynyl group, but may not be limited thereto.

Through the whole document, the term "aryl group" refers to a monovalent functional group formed by removing one hydrogen atom from arene having at least one ring, and may include, for example, phenyl, biphenyl, terphenyl, naphthyl, anthryl, phenanthryl, pyrenyl, or all available isomers thereof, but may not be limited thereto. The arene refers to hydrocarbon having aromatic rings and includes monocyclic or polycyclic hydrocarbon. The polycyclic hydrocarbon includes at least one aromatic ring and may additionally include an aromatic ring or a non-aromatic ring, but may not be limited thereto.

Through the whole document, the term "cycloalkyl group" refers to a monovalent functional group having a saturated hydrocarbon ring, and may include a $C_{3-8}$ cycloalkyl group or $C_{3-6}$ cycloalkyl group, and may include, for example, cyclopropyl, cyclobutyl, cyclopentyl, cyclohexyl, cycloheptyl, cyclooctyl, or all available isomers thereof, but may not be limited thereto.

Through the whole document, the term "alkoxy group" refers to a group having an oxygen atom in addition to the above-defined alkyl group, and may include a $C_{1-20}$ alkoxy group, $C_{1-15}$ alkoxy group, $C_{1-10}$ alkoxy group, $C_{1-8}$ alkoxy group or $C_{1-5}$ alkoxy group, and may include, for example, methoxy, ethoxy, propoxy, butoxy, pentoxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy, eicosyloxy, or all available isomers thereof, but may not be limited thereto.

Through the whole document, the term "alicyclic epoxy group" refer to a alicyclic group having epoxy group, and may include a structure of

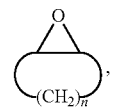

in which n is integer of n≥1

Hereinafter, the present disclosure will be explained in detail with reference to embodiments. However, the present disclosure may not be limited thereto.

In a first aspect of the present disclosure, there is provided a transparent flexible hard coated film formed by using an ionic polymerizable siloxane hard coating composition including: oligosiloxane [component (A)] having on average at least one alicyclic epoxy group per molecule; and an ionic polymerization initiator [component (C)]. Provided, however, that the alicyclic epoxy group is not a glycidyl group.

According to an embodiment of the present disclosure, the ionic polymerizable siloxane hard coating composition may further include a reactive diluent [component (B)] having on average at least one alicyclic epoxy group or at least one oxetane group per molecule, but may not be limited thereto. For example, the weight ratio of the oligosiloxane: the reactive diluent [component (B)] may be about 100: about 0, about 100:about 5, about 100:about 10, about 100:about 15, about 100:about 20, about 100:about 25, about 100:about 30, about 100:about 35, about 100:about 40, about 100:about 45, or about 100:about 50, but may not be limited thereto.

According to an embodiment of the present disclosure, the ionic polymerizable siloxane hard coating composition may be produced by a method further including mixing the component (A) with the component (B) prior to mixing the component (A) with the component (C), but may not be limited thereto.

According to an embodiment of the present disclosure, the ionic polymerizable siloxane hard coating composition may be produced by a method including mixing the component (C) of from about 0.1 parts by weight to about 10 parts by weight with respect to about 100 parts by weight of the component (A) or a mixture of the component (A) and the component (B), but may not be limited thereto. By way of example, the ionic polymerizable siloxane hard coating composition including the component (A) and the component (C) may be produced by mixing the component (C) of from about 0.1 parts by weight to about 10 parts by weight with respect to about 100 parts by weight of the component (A); and the ionic polymerizable siloxane hard coating composition including the component (A), the component (B), and the component (C) may be produced by first preparing a mixture of the component (A) and the component (B) to have a viscosity of from about 10 mPa·s to about 200,000 mPa·s at 25° C. and then mixing the component (C) of from about 0.1 parts by weight to about 10 parts by weight with respect to about 100 parts by weight of the above produced mixture.

According to an embodiment of the present disclosure, the component (A) may have an average unit chemical formula represented by the following Chemical Formula 1, but may not be limited thereto:

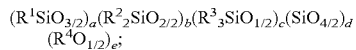

In the above chemical formula 1, $R^1$, $R^2$, and $R^3$ are each independently selected from the group consisting of a substitutable $C_{1-20}$ alkyl group, a substitutable $C_{2-20}$ alkenyl group, a substitutable $C_{2-20}$ alkynyl group, and a substitutable $C_{6-20}$ aryl group, and on average, provided that at least one of the $R^1$, $R^2$, and $R^3$ includes an alicyclic epoxy group; a substitutable substituent in the $R^1$, $R^2$, and $R^3$ is at least one member se3lected from the group consisting of a $C_{1-20}$ alkyl group, a $C_{3-8}$ cycloalkyl group, a $C_{1-20}$ alkoxy group, an amino group, an acryl group, a (meth)acryl group, halogen, an allyl group, a mercapto group, an ether group, an ester group, a carbonyl group, a carboxyl group, a vinyl group, a nitro group, a sulfonyl group, a hydroxyl group, a cyclobutene group, an alkyd group, an urethane group, an oxetane group, a phenyl group, and combinations thereof; $R^4$ is a straight or branched $C_{1-7}$ alkyl group or hydrogen; a is a positive number; b is 0 or a positive number; c is 0 or a positive number; d is 0 or a positive number; e is 0 or a positive number; (b+c+d)/a is a number of from 0 to 1; and e/(a+b+c+d) is a number of from 0 to 0.4.

By way of example, the component (A) may be one kind of oligosiloxane, or may be a mixture including two or more kinds of oligosiloxane different in property, but may not be limited thereto.

The component (B) is a reactive diluent for reducing a viscosity of the component (A) and facilitating processability when the viscosity is as high as being more than about 200,000 mPa·s, and may be one kind of the reactive diluent, or may be a mixture including two or more kinds of the reactive diluents having different property, but may not be limited thereto. By way of example, when a mixture is produced by adding the component (B) to the component (A), an added amount of the component (B) is not particularly limited, but may be controlled to make a viscosity of the mixture to be in a range of from about 10 mPa·s to about 200,000 mPa·s at 25° C. By way of example, the mixture of the component (A) and the component (B) may have a viscosity of from about 10 mPa·s to about 200,000 mPa·s, from about 30 mPa·s to about 200,000 mPa·s, from about 50 mPa·s to about 200,000 mPa·s, from about 80 mPa·s to about 200,000 mPa·s, from about 100 mPa·s to about 200,000 mPa·s, from about 300 mPa·s to about 200,000 mPa·s, from about 500 mPa·s to about 200,000 mPa·s, from about 800 mPa·s to about 200,000 mPa·s, from about 1,000 mPa·s to about 200,000 mPa·s, from about 1,500 mPa·s to about 200,000 mPa·s, from about 2,000 mPa·s to about 200,000 mPa·s, from about 3,000 mPa·s to about 200,000 mPa·s from about 5,000 mPa·s to about 200,000 mPa·s, from about 8,000 mPa·s to about 200,000 mPa·s, from about 10,000 mPa·s to about 200,000 mPa·s, from about 15,000 mPa·s to about 200,000 mPa·s, from about 20,000 mPa·s to about 200,000 mPa·s, from about 30,000 mPa·s to about 200,000 mPa·s, from about 50,000 mPa·s to about 200,000 mPa·s, from about 80,000 mPa·s to about 200,000 mPa·s, from about 100,000 mPa·s to about 200,000 mPa·s, from about 120,000 mPa·s to about 200,000 mPa·s, from about 150,000 mPa·s to about 200,000 mPa·s, from about 180,000 mPa·s to about 200,000 mPa·s, from about 10 mPa·s to about 180,000 mPa·s, from about 10 mPa·s to about 150,000 mPa·s, from about 10 mPa·s to about 120,000 mPa·s, from about 10 mPa·s to about 100,000 mPa·s, from about 10 mPa·s to about 80,000 mPa·s, from about 10 mPa·s to about 50,000 mPa·s, from about 10 mPa·s to about 30,000 mPa·s, from about 10 mPa·s to about 20,000 mPa·s, from about 10 mPa·s to about 15,000 mPa·s, from about 10 mPa·s to about 10,000 mPa·s, from about 10 mPa·s to about 8,000 mPa·s, from about 10 mPa·s to about 5,000 mPa·s, from about 10 mPa·s to about 3,000 mPa·s, from about 10 mPa·s to about 2,000 mPa·s, from about 10 mPa·s to about 1,500 mPa·s, from about 10 mPa·s to about 1,000 mPa·s, from about 10 mPa·s to about 800 mPa·s, from about 10 mPa·s to about 500 mPa·s, from about 10 mPa·s to about 300 mPa·s, from about 10 mPa·s to about 100 mPa·s, from about 10 mPa·s to about 80 mPa·s, from about 10 mPa·s to about 50 mPa·s, or from about 10 mPa·s to about 30 mPa·s, but may not be limited thereto.

The reactive diluent may include on average at least one alicyclic epoxy group per molecule, but may not be limited thereto. The reactive diluent including the alicyclic epoxy group may include, for example, at least one component selected from the group consisting of 4-vinylcyclohexene dioxide, cyclohexene vinyl monoxide, (3,4-epoxycyclohexyl)methyl 3,4-epoxycyclohexylcarboxylate, 3,4-epoxycyclohexylmethyl methacrylate, 3,4-epoxycyclohexanecarboxylate, 2-(3,4-epoxycyclohexyl)-1,3-dioxolane, and bis (3,4-epoxycyclohexylmethyl)adipate, but may not be limited thereto.

The reactive diluent may include on average at least one oxetane group per molecule, but may not be limited thereto. The reactive diluent including the oxetane groups may include, for example, at least one component selected from the group consisting of, 3-methyloxetane, 2-methyloxetane, 3-oxetanol, 2-methyleneoxetane, 3-methyl-3-hydroxymethyloxetane, 3-ethyl-3-hydroxymethyloxetane, 3,3-oxetanedimethane thiol, 2-ethylhexyl oxetane, 4-(3-methyloxetane-3-yl) benzonitrile, N-(2,2-dimethylpropyl)-3-methyl-3-oxetanemethanamine, N-(1,2-dimethylbutyl)-3-methyl-3-oxetanennethanannine, xylylene bisoxetane, and 3-ethyl-3 [{(3-ethyloxetane-3-yl)methoxy}methyl]oxetane, (3-ethyloxetane-3-yl)methyl (meth)acrylate, and 4-[(3-ethyloxetane-3-yl)methoxy]butan-1-ol, but may not be limited thereto.

According to an embodiment of the present disclosure, the ionic polymerizable siloxane hard coating composition used in the transparent flexible hard coated film may be produced by including or not including the reactive diluent as the component (B).

According to an embodiment of the present disclosure, the component (C) may include a cationic polymerization initiator or an anionic polymerization initiator, but may not be limited thereto. The component (C) is an ionic polymerization initiator for polymerization of the alicyclic epoxy group or oxetane group included in the component (B) and the component (A). By way of example, an added amount of the component (C) is not particularly limited, but may be in a range of from about 0.1 parts by weight to about 10 parts by weight with respect to about 100 parts by weight of the component (A) or the mixture of the component (A) and the component (B), but may not be limited thereto. By way of example, an added amount of the component (C) may be in a range of from about 0.1 parts by weight to about 10 parts by weight, from about 0.5 parts by weight to about 10 parts by weight, from about 1 parts by weight to about 10 parts by weight, from about 1.5 parts by weight to about 10 parts by weight, from about 2 parts by weight to about 10 parts by weight, from about 3 parts by weight to about 10 parts by weight, from about 5 parts by weight to about 10 parts by weight, from about 7 parts by weight to about 10 parts by weight, from about 9 parts by weight to about 10 parts by weight, from about 0.1 part by weight to about 9 parts by weight, from about 0.1 parts by weight to about 7 parts by weight, from about 0.1 parts by weight to about 5 parts by weight, from about 0.1 parts by weight to about 3 parts by weight, from about 0.1 parts by weight to about 2 parts by weight, from about 0.1 parts by weight to about 1.5 parts by weight, from about 0.1 parts by weight to about 1 parts by weight, or from about 0.1 parts by weight to about 0.5 parts by weight, with respect to about 100 parts by weight of the component (A) or the mixture of the component (A) and the component (B), but may not be limited thereto.

The cationic polymerization initiator may employ, without limitation, those known in the art as materials capable of generating an acid according to the Brnsted-Lowry acid-base definition or the Lewis acid-base definition, and may include at least one component selected from the group consisting of 3-methyl-2-butenyltetramethylene sulfonium hexafluoroantimonate salt, ytterbium(III) trifluoromethanesulfonate salt, samarium(III) trifluoromethanesulfonate salt, erbium(III) trifluoromethanesulfonate salt, triarylsulfonium hexafluoroantimonate salt, triarylsulfonium hexafluorophosphate salt, lanthanum(III) trifluoromethanesulfonate salt, tetrabutylphosphonium methanesulfonate salt, ethyltriphenylphosphonium bromide salt, diphenyliodonium hexafluoroantimonate salt, diphenyliodonium hexafluorophosphate salt, ditolyliodonium hexafluorophosphate salt, 9-(4-hydroxyethoxy phenyl)thianthrenium hexafluorophosphate salt, and 1-(3-methylbut-2-enyl)tetrahydro-1H-thiophenium hexafluoroantimonate salt, but may not be limited thereto.

The anionic polymerization initiator may include a tertiary amine or imidazole, but may not be limited thereto. By way of example, the anionic polymerization initiator may include at least one component selected from the group consisting of o-(dimethylaminomethyl)phenol, tris-(dimethylaminomethyl)phenol, benzyldimethylamine, α-methylbenzyldimethylamine, and 2-ethyl-4-methylimidazole, but may not be limited thereto.

According to an embodiment of the present disclosure, the transparent flexible hard coated films produced by using the ionic polymerizable siloxane hard coating composition in accordance with the present disclosure contains oligosiloxane [component (A)] having on average at least one alicyclic epoxy group per molecule, which have the stronger scratch resistance, the higher surface hardness, and the higher flexibility than those of the coated films produced by using oligosiloxane [component (D)] having on average at least one glycidyl group (non-alicyclic epoxide) per molecule was used instead of oligosiloxane [component (A)].

In a second aspect of the present disclosure, there is provided a method of producing a transparent flexible hard coated film according to the first aspect of the present disclosure, including: coating an ionic polymerizable siloxane hard coating composition on a substrate film; and polymerizing the coating layer of the ionic polymerizable siloxane hard coating composition. Detailed descriptions of the repeated parts as described in the first aspect of the present disclosure will be omitted. Although omitted in the second aspect of the present disclosure, the description of the first aspect of the present disclosure may also be applied in the same manner to the second aspect.

According to an embodiment of the present disclosure, the ionic polymerizable siloxane hard coating composition including: oligosiloxane [component (A)] having on average at least one alicyclic epoxy group per molecule; and an ionic polymerization initiator [component (C)]. Provided, however, that the alicyclic epoxy group is not a glycidyl group.

According to an embodiment of the present disclosure, the ionic polymerizable siloxane hard coating composition may further include a reactive diluent [component (B)] having on average at least one alicyclic epoxy group or at least one oxetane group per molecule, but may not be limited thereto. For example, the weight ratio of the oligosiloxane: the reactive diluent [component (B)] may be about 100: about 0, about 100:about 5, about 100:about 10, about 100:about 15, about 100:about 20, about 100: about 25, about 100:about 30, about 100:about 35, about 100:about 40, about 100:about 45, or about 100:about 50, but may not be limited thereto.

According to an embodiment of the present disclosure, the ionic polymerizable siloxane hard coating composition may further include an organic solvent of from about 0.1 parts by weight to about 100 parts by weight, with respect to about 100 parts by weight of the composition, but may not be limited thereto. When the transparent flexible hard coated film is produced by coating the ionic polymerizable siloxane hard coating composition on the substrate film, the organic solvent may be added in order to control a viscosity of the composition and a thickness of the coated film and also facilitate coating property, but may not be limited thereto. An amount of the organic solvent is not particularly limited, and may be in a range of, for example, from about 0.1 parts by weight to about 100 parts by weight, from about 0.3 parts by weight to about 100 parts by weight, from about 0.5 parts by weight to about 100 parts by weight, from about 1 parts by weight to about 100 parts by weight, from about 2 parts by weight to about 100 parts by weight, from about 3 parts by weight to about 100 parts by weight, from about 5 parts by weight to about 100 parts by weight, from about 8 parts by weight to about 100 parts by weight, from about 10 parts by weight to about 100 parts by weight, from about 15 parts by weight to about 100 parts by weight, from about 20 parts by weight to about 100 parts by weight, from about 40 parts by weight to about 100 parts by weight, from about 60 parts by weight to about 100 parts by weight, from about 80 parts by weight to about 100 parts by weight, from about 0.1 parts by weight to about 80 parts by weight, from about 0.1 parts by weight to about 60 parts by weight, from about 0.1 parts by weight to about 40 parts by weight, from about 0.1 parts by weight to about 20 parts by weight, from about 0.1 parts by weight to about 15 parts by weight, from about 0.1 parts by weight to about 10 parts by weight, from about 0.1 parts by weight to about 8 parts by weight, from about 0.1 parts by weight to about 5 parts by weight, from about 0.1 parts by weight to about 3 parts by weight, from about 0.1 parts by weight to about 2 parts by weight, from about 0.1 parts by weight to about 1 parts by weight, from about 0.1 parts by weight to about 0.5 parts by weight, or from about 0.1 parts by weight to about 0.3 parts by weight with respect to about 100 parts by weight of the composition, but may not be limited thereto.

The organic solvent may include, for example, at least one component selected from the group consisting of acetone, methylethylketone, methylbutylketone, methylisobutylketone, cyclohexanone, methylcellosolve, ethylcellosolve, cellosolveacetate, butylcellosolve, ethylether, dioxane, tetrahydrofuran, methyl acetate, ethyl acetate, propyl acetate, isopropyl acetate, butyl acetate, isobutyl acetate, pentyl acetate, isopentyl acetate, butanol, 2-butanol, isobutyl alcohol, isopropyl alcohol, dichloromethane, chloroform, dichloroethane, trichloroethane, tetrachloroethane, dichloroethylene, trichloroethylene, tetrachloroethylene, chlorobenzene, ortho-dichlorobenzene, n-hexane, cyclohexanol, methylcyclohexanol, benzene, toluene, and xylene, but may not be limited thereto.

The method of producing the transparent flexible hard coated film may further include a surface treatment, such as a UV-ozone treatment, a flame treatment, a deaeration treatment, or a plasma treatment and the like, to the substrate film prior to the coating in order to increase adhesion with respect to the coated film, but may not be limited thereto. The substrate film used for coating the siloxane hard coating composition is not particularly limited, but one of those having a glass transition temperature ($T_g$) equal to or higher than a heat treatment temperature required for polymerizing the ionic polymerizable siloxane hard coating composition may be selected and to be used.

According to an embodiment of the present disclosure, the substrate film may include, as a main component, at least one resin selected from the group consisting of acryl-based resin, styrene-based resin, acrylonitrile butadiene styrene-based resin, styrene acrylonitrile-based resin, polypropylene-based resin, polyethylene-based resin, polyacetal-based resin, polycarbonate-based resin, polyamide-based resin, polyvinyl chloride-based resin, polyester-based resin, polyurethane-based resin, norbornene-based resins cycloolefin-based resin, epoxy-based resin, and ether sulfone-based resin, but may not be limited thereto.

According to an embodiment of the present disclosure, the polymerizing may be performed by a light irradiation or a heat treatment, but may not be limited thereto. If the ionic polymerizable siloxane hard coating composition is coated on the substrate film and polymerized by light irradiation or heat treatment, a transparent flexible hard coated film having a high surface hardness and an excellent flexibility can be produced. By way of example, if the polymerizing is performed by the light irradiation, it is necessary to control a wavelength range and quantity of light suitable for the added polymerization initiator, and it is possible to obtain a uniformly coated film through a subsequent heat treatment. A temperature for the heat treatment is not particularly limited, but may be equal to or lower than the glass transition temperature ($T_g$) of the substrate film used in the transparent flexible hard coated film according to the present disclosure, but may not be limited thereto. If the polymerizing is performed by the heat treatment, it is necessary to control a temperature range and quantity of heat suitable for the added polymerization initiator, and the temperature range may be equal to or lower than the glass transition temperature ($T_g$) of the substrate film used in the transparent flexible hard coated film according to the present disclosure, but may not be limited thereto.

The transparent flexible hard coated film according to the present disclosure, which is obtained by coating and polymerizing the ionic polymerizable siloxane hard coating composition on the substrate film, may include a scratch-resistant surface having a pencil hardness of from about 3 H to about 9 H and may have flexibility.

According to an embodiment of the present disclosure, the transparent flexible hard coated films produced by using the ionic polymerizable siloxane hard coating composition in accordance with the present disclosure contains oligosiloxane [component (A)] having on average at least one alicyclic epoxy group per molecule, which have the stronger scratch resistance, the higher surface hardness, and the higher flexibility than those of the coated films produced by using oligosiloxane [component (D)] having on average at least one glycidyl group (non-alicyclic epoxide) per molecule was used instead of oligosiloxane [component (A)].

MODE FOR CARRYING OUT THE INVENTION

Hereinafter, the present disclosure will be explained in detail with reference to examples. However, the present disclosure may not be limited thereto.

EXAMPLES

The chemical formulas of the components (A) in the following Examples are described as average unit chemical formulas. CE is an abbreviation of an alicyclic epoxy group represented by the formula

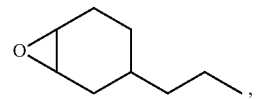

Ph is an abbreviation of a phenyl group, MC is an abbreviation of a (meth)acryl group, and Me is an abbreviation of a methyl group.

Example 1

Component (A): $(CESiO_{3/2})_1(MeO_{1/2})_{0.05}$;
Component (B): (3,4-epoxycyclohexyl)methyl 3,4-epoxycyclohexylcarboxylate; and
Component (C): triarylsulfonium hexafluoroantimonate salt.

The component (A) and the component (B) were mixed independently at a weight ratio of 100:0, 100:5, 100:10, 100:30, and 100:50, respectively, and 100 parts by weight of each of the mixtures was mixed with 2 parts by weight of the component (C) so that five kinds of ionic polymerizable siloxane hard coating compositions were prepared.

The ionic polymerizable siloxane hard coating compositions were independently coated on 100 μm PET (polyester-based resin) films of which surfaces were treated with plasma to have thicknesses of 10 μm, 40 μm, and 80 μm, respectively, and then exposed to a mercury UV lamp (80 mW/cm²) for 10 seconds and heat-treated at a temperature of 80° C. for 30 minutes, so that transparent flexible hard coated films were produced. If necessary, methylethylketone (MEK) was added as an organic solvent to the ionic polymerizable siloxane hard coating compositions to control a coating thickness during the coating process.

Example 2

Component (A): $(CESiO_{3/2})_{0.9}(MCSiO_{3/2})_{0.1}(MeO_{1/2})_{0.04}$;
Component (B): (3,4-epoxycyclohexyl)methyl 3,4-epoxycyclohexylcarboxylate; and
Component (C): triarylsulfonium hexafluoroantimonate salt.

The component (A) and the component (B) were mixed independently at a weight ratio of 100:0, 100:5, 100:10, 100:30, and 100:50, respectively, and 100 parts by weight of each of the mixtures was mixed with 2 parts by weight of the component (C), so that five kinds of ionic polymerizable siloxane hard coating compositions were prepared.

The ionic polymerizable siloxane hard coating compositions were coated independently on 100 μm PET (polyester-based resin) films of which surfaces were treated with plasma, to have different thicknesses of 10 μm, 40 μm, and 80 μm, respectively, and then exposed to a mercury UV lamp (80 mW/cm$^2$) for 10 seconds and heat-treated at a temperature of 80° C. for 30 minutes, so that transparent flexible hard coated films were produced. If necessary, methylethylketone (MEK) was added as an organic solvent to the ionic polymerizable siloxane hard coating compositions to control a coating thickness during the coating process.

Example 3

Component (A): $(CESiO_{3/2})_{0.8}(Ph_2SiO_{2/2})_{0.2}(MeO_{1/2})_{0.04}$;
Component (B): (3,4-epoxycyclohexyl)methyl 3,4-epoxycyclohexylcarboxylate; and
Component (C): triarylsulfonium hexafluoroantimonate salt.

The component (A) and the component (B) were mixed independently at a weight ratio of 100:0, 100:5, 100:10, 100:30, and 100:50, respectively, and 100 parts by weight of each of the mixtures was mixed with 2 parts by weight of the component (C), so that five kinds of ionic polymerizable siloxane hard coating compositions were prepared.

The ionic polymerizable siloxane hard coating compositions were independently coated on 100 μm PET (polyester-based resin) films of which surfaces were treated with plasma, to have different thicknesses of 10 μm, 40 μm, and 80 μm, respectively, and then exposed to a mercury UV lamp (80 mW/cm$^2$) for 10 seconds and heat-treated at a temperature of 80° C. for 30 minutes, so that transparent flexible hard coated films were produced. If necessary, methylethylketone (MEK) was added as an organic solvent to the ionic polymerizable siloxane hard coating compositions to control a coating thickness during the coating process.

Example 4

Component (A): $(CESiO_{3/2})_1(MeO_{1/2})_{0.05}$;
Component (B): 3-ethyl-3[{(3-ethyloxetane-3-yl)methoxy}methyl]oxetane; and
Component (C): triarylsulfonium hexafluoroantimonate salt.

The component (A) and the component (B) were mixed independently at a weight ratio of 100:0, 100:5, 100:10, 100:30, and 100:50, respectively, and 100 parts by weight of each of the mixtures was mixed with 2 parts by weight of the component (C), so that five kinds of ionic polymerizable siloxane hard coating compositions were prepared.

The ionic polymerizable siloxane hard coating compositions were independently coated on 100 μm PET (polyester-based resin) films of which surfaces were treated with plasma, to have different thicknesses of 10 μm, 40 μm, and 80 μm, respectively, and then exposed to a mercury UV lamp (80 mW/cm$^2$) for 10 seconds and heat-treated at a temperature of 80° C. for 30 minutes, so that transparent flexible hard coated films were produced. If necessary, methylethylketone (MEK) was added as an organic solvent to the ionic polymerizable siloxane hard coating compositions to control a coating thickness during the coating process.

Example 5

Component (A): $(CESiO_{3/2})_1(MeO_{1/2})_{0.05}$;
Component (B): 4-[(3-ethyloxetane-3-yl)methoxy]butan-1-ol; and
Component (C): triarylsulfonium hexafluoroantimonate salt.

The component (A) and the component (B) were mixed independently at a weight ratio of 100:0, 100:5, 100:10, 100:30, and 100:50, respectively, and 100 parts by weight of each of the mixtures of was mixed with 2 parts by weight of the component (C), so that five kinds of ionic polymerizable siloxane hard coating compositions were prepared.

The ionic polymerizable siloxane hard coating compositions were independently coated on 100 μm PET (polyester-based resin) films of which surfaces were treated with plasma, to have different thicknesses of 10 μm, 40 μm, and 80 μm, respectively, and then exposed to a mercury UV lamp (80 mW/cm$^2$) for 10 seconds and heat-treated at a temperature of 80° C. for 30 minutes, so that transparent flexible hard coated films were produced. If necessary, methylethylketone (MEK) was added as an organic solvent to the ionic polymerizable siloxane hard coating compositions to control a coating thickness during the coating process.

Example 6

Component (A): $(CESiO_{3/2})_1(MeO_{1/2})_{0.05}$;
Component (B): (3,4-epoxycyclohexyl)methyl 3,4-epoxycyclohexylcarboxylate; and
Component (C): 1-(3-methylbut-2-enyl)tetrahydro-1H-thiophenium hexafluoroantimonate salt.

The component (A) and the component (B) were mixed independently at a weight ratio of 100:0, 100:5, 100:10, 100:30, and 100:50, respectively, and 100 parts by weight of each of the mixtures was mixed with 2 parts by weight of the component (C), so that five kinds of ionic polymerizable siloxane hard coating compositions were prepared.

The ionic polymerizable siloxane hard coating compositions were coated independently on 100 μm PET (polyester-based resin) films of which surfaces were treated with plasma, to have different thicknesses of 10 μm, 40 μm, and 80 μm, respectively, and heat-treated at a temperature of 90° C. for 2 hours, so that transparent flexible hard coated films were produced. If necessary, methylethylketone (MEK) was added as an organic solvent to the ionic polymerizable siloxane hard coating compositions to control a coating thickness during the coating process.

Comparative Examples

The ionic polymerizable siloxane hard coating composition in accordance with the present disclosure contains oligosiloxane [component (A)] having on average at least one alicyclic epoxy group per molecule. In order to investigate the effect of the alicyclic epoxy group, Comparative Examples were conducted. For comparison, oligosiloxane [component (D)] having on average at least one glycidyl group (non-alicyclic epoxide) per molecule was used instead of oligosiloxane [component (A)]. The chemical formulas of the components (D) in the following Comparative Examples are described as average unit chemical formulas.

GL is an abbreviation of a glycidyl group represented by the formula

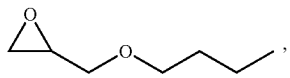

Ph is an abbreviation of a phenyl group, MC is an abbreviation of a (meth)acryl group, and Me is an abbreviation of a methyl group.

Comparative Example 1

Component (D): $(GLSiO_{3/2})_1(MeO_{1/2})_{0.05}$;
Component (B): (3,4-epoxycyclohexyl)methyl 3,4-epoxycyclohexylcarboxylate; and
Component (C): triarylsulfonium hexafluoroantimonate salt.

The component (D) and the component (B) were mixed independently at a weight ratio of 100:0, 100:5, 100:10, 100:30, and 100:50, respectively, and 100 parts by weight of each of the mixtures was mixed with 2 parts by weight of the component (C) so that five kinds of comparative ionic polymerizable siloxane compositions were prepared.

The comparative ionic polymerizable siloxane compositions were independently coated on 100 μm PET (polyester-based resin) films of which surfaces were treated with plasma to have thicknesses of 10 μm, 40 μm, and 80 μm, respectively, and then exposed to a mercury UV lamp (80 mW/cm$^2$) for 10 seconds and heat-treated at a temperature of 80° C. for 30 minutes, so that comparative coating films were produced. If necessary, methylethylketone (MEK) was added as an organic solvent to the comparative ionic polymerizable siloxane compositions to control a coating thickness during the coating process.

Comparative Example 2

Component (D): $(GLSiO_{3/2})_{0.9}(MCSiO_{3/2})_{0.1}(MeO_{1/2})_{0.06}$;
Component (B): (3,4-epoxycyclohexyl)methyl 3,4-epoxycyclohexylcarboxylate; and
Component (C): triarylsulfonium hexafluoroantimonate salt.

The component (D) and the component (B) were mixed independently at a weight ratio of 100:0, 100:5, 100:10, 100:30, and 100:50, respectively, and 100 parts by weight of each of the mixtures was mixed with 2 parts by weight of the component (C), so that five kinds of comparative ionic polymerizable siloxane compositions were prepared.

The comparative ionic polymerizable siloxane compositions were coated independently on 100 μm PET (polyester-based resin) films of which surfaces were treated with plasma, to have different thicknesses of 10 μm, 40 μm, and 80 μm, respectively, and then exposed to a mercury UV lamp (80 mW/cm$^2$) for 10 seconds and heat-treated at a temperature of 80° C. for 30 minutes, so that comparative coating films were produced. If necessary, methylethylketone (MEK) was added as an organic solvent to the comparative ionic polymerizable siloxane compositions to control a coating thickness during the coating process.

Comparative Example 3

Component (D): $(GLSiO_{3/2})_{0.8}(Ph_2SiO_{2/2})_{0.2}(MeO_{1/2})_{0.06}$;
Component (B): (3,4-epoxycyclohexyl)methyl 3,4-epoxycyclohexylcarboxylate; and
Component (C): triarylsulfonium hexafluoroantimonate salt.

The component (D) and the component (B) were mixed independently at a weight ratio of 100:0, 100:5, 100:10, 100:30, and 100:50, respectively, and 100 parts by weight of each of the mixtures was mixed with 2 parts by weight of the component (C), so that five kinds of comparative ionic polymerizable siloxane compositions were prepared.

The comparative ionic polymerizable siloxane compositions were independently coated on 100 μm PET (polyester-based resin) films of which surfaces were treated with plasma, to have different thicknesses of 10 μm, 40 μm, and 80 μm, respectively, and then exposed to a mercury UV lamp (80 mW/cm$^2$) for 10 seconds and heat-treated at a temperature of 80° C. for 30 minutes, so that comparative coating films were produced. If necessary, methylethylketone (MEK) was added as an organic solvent to the comparative ionic polymerizable siloxane compositions to control a coating thickness during the coating process.

Comparative Example 4

Component (D): $(CESiO_{3/2})_1(MeO_{1/2})_{0.05}$;
Component (B): 3-ethyl-3[{(3-ethyloxetane-3-yl)methoxy}methyl]oxetane; and
Component (C): triarylsulfonium hexafluoroantimonate salt.

The component (D) and the component (B) were mixed independently at a weight ratio of 100:0, 100:5, 100:10, 100:30, and 100:50, respectively, and 100 parts by weight each of the mixtures was mixed with 2 parts by weight of the component (C), so that five kinds of comparative ionic polymerizable siloxane compositions were prepared.

The comparative ionic polymerizable siloxane compositions were independently coated on 100 μm PET (polyester-based resin) films of which surfaces were treated with plasma, to have different thicknesses of 10 μm, 40 μm, and 80 μm, respectively, and then exposed to a mercury UV lamp (80 mW/cm$^2$) for 10 seconds and heat-treated at a temperature of 80° C. for 30 minutes, so that comparative coating films were produced. If necessary, methylethylketone (MEK) was added as an organic solvent to the comparative ionic polymerizable siloxane compositions to control a coating thickness during the coating process.

Comparative Example 5

Component (D): $(GLSiO_{3/2})_1(MeO_{1/2})_{0.05}$;
Component (B): 4-[(3-ethyloxetane-3-yl)methoxy]butan-1-ol; and
Component (C): triarylsulfonium hexafluoroantimonate salt.

The component (D) and the component (B) were mixed independently at a weight ratio of 100:0, 100:5, 100:10, 100:30, and 100:50, respectively, and 100 parts by weight of each of the mixtures of was mixed with 2 parts by weight of the component (C), so that five kinds of comparative ionic polymerizable siloxane compositions were prepared.

The comparative ionic polymerizable siloxane compositions were independently coated on 100 μm PET (polyester-based resin) films of which surfaces were treated with plasma, to have different thicknesses of 10 μm, 40 μm, and 80 μm, respectively, and then exposed to a mercury UV lamp (80 mW/cm$^2$) for 10 seconds and heat-treated at a temperature of 80° C. for 30 minutes, so that comparative coating films were produced. If necessary, methylethylketone (MEK) was added as an organic solvent to the comparative ionic polymerizable siloxane compositions to control a coating thickness during the coating process.

Comparative Example 6

Component (D): $(GLSiO_{3/2})_1(MeO_{1/2})_{0.05}$;
Component (B): (3,4-epoxycyclohexyl)methyl 3,4-epoxycyclohexylcarboxylate; and
Component (C): 1-(3-methylbut-2-enyl)tetrahydro-1H-thiophenium hexafluoroantimonate salt.

The component (D) and the component (B) were mixed independently at a weight ratio of 100:0, 100:5, 100:10, 100:30, and 100:50, respectively, and 100 parts by weight of each of the mixtures was mixed with 2 parts by weight of the component (C), so that five kinds of comparative ionic polymerizable siloxane compositions were prepared.

The comparative ionic polymerizable siloxane compositions were coated independently on 100 μm PET (polyester-based resin) films of which surfaces were treated with plasma, to have different thicknesses of 10 μm, 40 μm, and 80 μm, respectively, and heat-treated at a temperature of 90° C. for 2 hours, so that comparative coating films were produced. If necessary, methylethylketone (MEK) was added as an organic solvent to the comparative ionic polymerizable siloxane compositions to control a coating thickness during the coating process.

Experimental Examples

<Experimental Example 1> Pencil Hardness Test

In order to measure the surface hardness of the transparent flexible hard coated films produced according to the present Examples and the comparative coating films produced according to the present Comparative Examples, a pencil hardness tester was used according to ASTM D3363, and results thereof are as shown in the following Tables 1 to 5.

<Experimental Example 2> Bending Test

In order to evaluate the flexibility of the transparent flexible hard coated films produced according to the present Examples and the comparative coating films produced according to the present Comparative Examples, a bending test with a bending radius of 10 mm was repeated 1,000 times with the coating layers on the inside. Whether or not the films pass through the test was determined depending on whether a crack occurs or not. Results thereof are as shown in the following Tables 1 to 5 with symbols ○ (no occurrence of crack) and X (occurrence of crack).

<Experimental Example 3> Scratch Resistance Test

In order to evaluate the scratch resistance of the transparent flexible hard coated films produced according to the present Examples and the comparative coating films produced according to the present Comparative Examples, a steel wool #0000 was used to rub the surfaces of the hard coated films repeatedly 300 times under pressure of 2.45 N/cm$^2$. Whether or not the films pass through the test was determined depending on whether a scratch occurs or not. Results thereof are as shown in the following Tables 1 to 5 with symbols ○ (no occurrence of scratch) and X (occurrence of scratch).

TABLE 1

| | | Weight Ratio of Oligosiloxane:the reactive diluent | | | | | |
|---|---|---|---|---|---|---|---|
| | Coating | Examples (A):(B) = 100:0 | | | Comparative Examples (D):(B) = 100:0 | | |
| | Thickness (μm) | Pencil Hardness | Bending Test | Scratch Resistance | Pencil Hardness | Bending Test | Scratch Resistance |
| 1 | 10 | 8H | ○ | ○ | 4H | ○ | X |
| | 40 | 9H | ○ | ○ | 5H | ○ | X |
| | 80 | 9H | ○ | ○ | 5H | ○ | X |
| 2 | 10 | 8H | ○ | ○ | 3H | ○ | X |
| | 40 | 8H | ○ | ○ | 4H | ○ | X |
| | 80 | 9H | ○ | ○ | 4H | ○ | X |
| 3 | 10 | 7H | ○ | ○ | 2H | ○ | X |
| | 40 | 7H | ○ | ○ | 3H | ○ | X |
| | 80 | 8H | ○ | ○ | 3H | ○ | X |
| 4 | 10 | 8H | ○ | ○ | 4H | ○ | X |
| | 40 | 9H | ○ | ○ | 5H | ○ | X |
| | 80 | 9H | ○ | ○ | 5H | ○ | X |
| 5 | 10 | 8H | ○ | ○ | 4H | ○ | X |
| | 40 | 9H | ○ | ○ | 5H | ○ | X |
| | 80 | 9H | ○ | ○ | 5H | ○ | X |
| 6 | 10 | 8H | ○ | ○ | 4H | ○ | X |
| | 40 | 9H | ○ | ○ | 5H | ○ | X |
| | 80 | 9H | ○ | ○ | 5H | ○ | X |

TABLE 2

| Coating | | Weight Ratio of Oligosiloxane:the reactive diluent | | | | | |
|---|---|---|---|---|---|---|---|
| | | Examples (A):(B) = 100:5 | | | Comparative Examples (D):(B) = 100:5 | | |
| | Thickness (μm) | Pencil Hardness | Bending Test | Scratch Resistance | Pencil Hardness | Bending Test | Scratch Resistance |
| 1 | 10 | 8H | ○ | ○ | 3H | ○ | X |
|   | 40 | 9H | ○ | ○ | 5H | ○ | X |
|   | 80 | 9H | ○ | ○ | 5H | ○ | X |
| 2 | 10 | 7H | ○ | ○ | 3H | ○ | X |
|   | 40 | 8H | ○ | ○ | 3H | ○ | X |
|   | 80 | 8H | ○ | ○ | 4H | ○ | X |
| 3 | 10 | 6H | ○ | ○ | 2H | ○ | X |
|   | 40 | 7H | ○ | ○ | 2H | ○ | X |
|   | 80 | 7H | ○ | ○ | 3H | ○ | X |
| 4 | 10 | 8H | ○ | ○ | 3H | ○ | X |
|   | 40 | 9H | ○ | ○ | 4H | ○ | X |
|   | 80 | 9H | ○ | ○ | 5H | ○ | X |
| 5 | 10 | 8H | ○ | ○ | 3H | ○ | X |
|   | 40 | 9H | ○ | ○ | 3H | ○ | X |
|   | 80 | 9H | ○ | ○ | 4H | ○ | X |
| 6 | 10 | 8H | ○ | ○ | 3H | ○ | X |
|   | 40 | 9H | ○ | ○ | 4H | ○ | X |
|   | 80 | 9H | ○ | ○ | 4H | ○ | X |

TABLE 3

| Coating | | Weight Ratio of Oligosiloxane:the reactive diluent | | | | | |
|---|---|---|---|---|---|---|---|
| | | Examples (A):(B) = 100:10 | | | Comparative Examples (D):(B) = 100:10 | | |
| | Thickness (μm) | Pencil Hardness | Bending Test | Scratch Resistance | Pencil Hardness | Bending Test | Scratch Resistance |
| 1 | 10 | 8H | ○ | ○ | 3H | ○ | X |
|   | 40 | 9H | ○ | ○ | 4H | ○ | X |
|   | 80 | 9H | ○ | ○ | 4H | ○ | X |
| 2 | 10 | 6H | ○ | ○ | 3H | ○ | X |
|   | 40 | 7H | ○ | ○ | 3H | ○ | X |
|   | 80 | 8H | ○ | ○ | 4H | ○ | X |
| 3 | 10 | 5H | ○ | ○ | 2H | ○ | X |
|   | 40 | 6H | ○ | ○ | 2H | ○ | X |
|   | 80 | 7H | ○ | ○ | 3H | ○ | X |
| 4 | 10 | 8H | ○ | ○ | 3H | ○ | X |
|   | 40 | 9H | ○ | ○ | 3H | ○ | X |
|   | 80 | 9H | ○ | ○ | 4H | ○ | X |
| 5 | 10 | 8H | ○ | ○ | 3H | ○ | X |
|   | 40 | 9H | ○ | ○ | 3H | ○ | X |
|   | 80 | 9H | ○ | ○ | 4H | ○ | X |
| 6 | 10 | 7H | ○ | ○ | 3H | ○ | X |
|   | 40 | 9H | ○ | ○ | 4H | ○ | X |
|   | 80 | 9H | ○ | ○ | 4H | ○ | X |

TABLE 4

| Coating | | Weight Ratio of Oligosiloxane:the reactive diluent | | | | | |
|---|---|---|---|---|---|---|---|
| | | Examples (A):(B) = 100:30 | | | Comparative Examples (D):(B) = 100:30 | | |
| | Thickness (μm) | Pencil Hardness | Bending Test | Scratch Resistance | Pencil Hardness | Bending Test | Scratch Resistance |
| 1 | 10 | 6H | ○ | ○ | 2H | ○ | X |
|   | 40 | 7H | ○ | ○ | 3H | ○ | X |
|   | 80 | 8H | ○ | ○ | 4H | ○ | X |

TABLE 4-continued

| | | Weight Ratio of Oligosiloxane:the reactive diluent | | | | | |
|---|---|---|---|---|---|---|---|
| | | Examples (A):(B) = 100:30 | | | Comparative Examples (D):(B) = 100:30 | | |
| Coating | Thickness (μm) | Pencil Hardness | Bending Test | Scratch Resistance | Pencil Hardness | Bending Test | Scratch Resistance |
| 2 | 10 | 4H | ○ | X | 1H | ○ | X |
|   | 40 | 6H | ○ | ○ | 2H | ○ | X |
|   | 80 | 7H | ○ | ○ | 2H | ○ | X |
| 3 | 10 | 4H | ○ | X | 1H | ○ | X |
|   | 40 | 5H | ○ | ○ | 1H | ○ | X |
|   | 80 | 6H | ○ | ○ | 1H | ○ | X |
| 4 | 10 | 6H | ○ | ○ | 2H | ○ | X |
|   | 40 | 7H | ○ | ○ | 2H | ○ | X |
|   | 80 | 8H | ○ | ○ | 3H | ○ | X |
| 5 | 10 | 5H | ○ | ○ | 2H | ○ | X |
|   | 40 | 7H | ○ | ○ | 2H | ○ | X |
|   | 80 | 8H | ○ | ○ | 3H | ○ | X |
| 6 | 10 | 5H | ○ | ○ | 2H | ○ | X |
|   | 40 | 7H | ○ | ○ | 3H | ○ | X |
|   | 80 | 8H | ○ | ○ | 3H | ○ | X |

TABLE 5

| | | Weight Ratio of Oligosiloxane:the reactive diluent | | | | | |
|---|---|---|---|---|---|---|---|
| | | Examples (A):(B) = 100:50 | | | Comparative Examples (D):(B) = 100:50 | | |
| Coating | Thickness (μm) | Pencil Hardness | Bending Test | Scratch Resistance | Pencil Hardness | Bending Test | Scratch Resistance |
| 1 | 10 | 5 H | ○ | ○ | 1H | ○ | X |
|   | 40 | 6 H | ○ | ○ | 2H | ○ | X |
|   | 80 | 7 H | ○ | ○ | 2H | ○ | X |
| 2 | 10 | 3 H | ○ | X | HB | ○ | X |
|   | 40 | 5 H | ○ | ○ | 1H | ○ | X |
|   | 80 | 6 H | ○ | ○ | 1H | ○ | X |
| 3 | 10 | 3 H | ○ | X | F | ○ | X |
|   | 40 | 4 H | ○ | X | HB | ○ | X |
|   | 80 | 5 H | ○ | ○ | HB | ○ | X |
| 4 | 10 | 5 H | ○ | ○ | 1H | ○ | X |
|   | 40 | 6 H | ○ | ○ | 1H | ○ | X |
|   | 80 | 7 H | ○ | ○ | 2H | ○ | X |
| 5 | 10 | 4 H | ○ | X | 1H | ○ | X |
|   | 40 | 6 H | ○ | ○ | 1H | ○ | X |
|   | 80 | 7 H | ○ | ○ | 2H | ○ | X |
| 6 | 10 | 4 H | ○ | X | 1H | ○ | X |
|   | 40 | 6 H | ○ | ○ | 2H | ○ | X |
|   | 80 | 7 H | ○ | ○ | 2H | ○ | X |

As shown in Tables 1 to 5 above, it was confirmed that the transparent flexible hard coated films produced according to the present Examples have the stronger scratch resistance, the higher surface hardness, and the higher flexibility than those of the present Comparative Examples with respect to the same weight ratio of Oligosiloxane:the reactive diluent, respectively.

Specifically, when the weight ratio of the Oligosiloxane: the reactive diluent is 100:0, the Pencil Hardness of the Examples had the range of from 7H to 9H, while the Pencil Hardness of the Comparative Examples had the range of from 2H to 5H. When the weight ratio of the Oligosiloxane: the reactive diluent is 100:5, the Pencil Hardness of the Examples had the range of from 7H to 9H, while the Pencil Hardness of the Comparative Examples had the range of from 2H to 5H. When the weight ratio of the Oligosiloxane: the reactive diluent is 100:10, the Pencil Hardness of the Examples had the range of from 5H to 9H, while the Pencil Hardness of the Comparative Examples had the range of from 2H to 4H. When the weight ratio of the Oligosiloxane: the reactive diluent is 100:30, the Pencil Hardness of the Examples had the range of from 4H to 8H, while the Pencil Hardness of the Comparative Examples had the range of from 1H to 4H. When the weight ratio of the Oligosiloxane: the reactive diluent is 100:50, the Pencil Hardness of the Examples had the range of from 3H to 7H, while the Pencil Hardness of the Comparative Examples had the range of from F to 2H.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

INDUSTRIAL APPLICABILITY

The transparent flexible hard coated film according to the present disclosure has a high scratch-resistant surface hardness and also has flexibility that enables a coated film to be unbroken when being bent. The method of producing a transparent flexible hard coated film according to the present disclosure is expected to contribute to the expansion of hard coated film application fields.

We claim:

1. An ionic polymerizable siloxane hard coating composition for forming a transparent flexible hard coated film, the composition comprising:
    oligosiloxane [component (A)] having on average at least one alicyclic epoxy group per molecule;
    a reactive diluent [component (B)] that is (3,4-epoxycyclohexyl)methyl 3,4-epoxycyclohexylcarboxylate or that has on average at least one oxetane group per molecule; and
    an ionic polymerization initiator [component (C)],
    wherein the ionic polymerizable siloxane hard coating composition is produced by a method including mixing the component (C) of from 0.1 part by weight to 10 parts by weight with respect to 100 parts by weight of the component (A),
    wherein the component (A) has an average unit chemical formula represented by the following Chemical Formula 1:

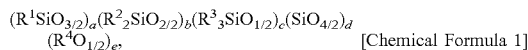  [Chemical Formula 1]

wherein in Chemical Formula 1,
    $R^1$ is an alicyclic epoxy group, and $R^2$ and $R^3$ are each independently selected from the group consisting of a substitutable $C_{1-20}$ alkyl group, a substitutable $C_{2-20}$ alkenyl group, a substitutable $C_{2-20}$ alkynyl group, and a substitutable $C_{6-20}$ aryl group, a substitutable substituent in the $R^2$, and $R^3$ is at least one member selected from the group consisting of a $C_{1-20}$ alkyl group, a $C_{3-8}$ cycloalkyl group, a $C_{1-20}$ alkoxy group, an amino group, an acryl group, a (meth)acryl group, halogen, an allyl group, a mercapto group, an ether group, an ester group, a carbonyl group, a carboxyl group, a vinyl group, a nitro group, a sulfone group, a hydroxyl group, a cyclobutene group, an alkyd group, an urethane group, an oxetane group, a phenyl group, and combinations thereof,
    $R^4$ is a straight or branched $C_{1-7}$ alkyl group or hydrogen,
    a is a positive number,
    b is 0 or a positive number,
    c is 0 or a positive number,
    d is 0 or a positive number,
    e is 0 or a positive number,
    (b+c+d)/a is a number of from 0 to 1,
    e/(a+b+c+d) is a number of from 0 to 0.4, and
    the alicyclic epoxy group is not a glycidyl group.

2. The ionic polymerizable siloxane hard coating composition of claim 1, wherein the ionic polymerizable siloxane hard coating composition is produced by a method further including mixing the component (A) with the component (B) prior to mixing the component (A) with the component (C).

3. The ionic polymerizable siloxane hard coating composition of claim 1, wherein the ionic polymerizable siloxane hard coating composition is produced by a method including mixing the component (C) of from 0.1 part by weight to 10 parts by weight with respect to 100 parts by weight of a mixture of the component (A) and the component (B).

4. The ionic polymerizable siloxane hard coating composition of claim 1, wherein the component (C) includes a cationic polymerization initiator or an anionic polymerization initiator.

5. A method of producing a transparent flexible hard coated film using the ionic polymerizable siloxane hard coating composition of claim 1, comprising:
    coating the ionic polymerizable siloxane hard coating composition on a substrate film; and
    polymerizing a coating layer of the ionic polymerizable siloxane hard coating composition.

6. The method of claim 5, wherein the substrate film includes a main component including at least one resin selected from the group consisting of acryl-based resin, styrene-based resin, acrylonitrile butadiene styrene-based resin, styrene acrylonitrile-based resin, polypropylene-based resin, polyethylene-based resin, polyacetal-based resin, polycarbonate-based resin, polyimide-based resin, polyvinyl chloride-based resin, polyester-based resin, polyurethane-based resin, norbornene-based resins cycloolefin-based resin, epoxy-based resin, and ether sulfone-based resin.

7. The method of claim 5, wherein the polymerizing is performed by a light irradiation or a heat treatment.

8. The ionic polymerizable siloxane hard coating composition of claim 1, wherein the alicyclic epoxy group is represented by the following:

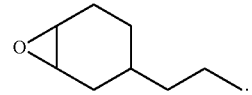

9. A transparent flexible hard coated film produced by the method of claim 5.

* * * * *